US012584583B2

(12) United States Patent (10) Patent No.: US 12,584,583 B2
Lisboa Santos et al. (45) Date of Patent: Mar. 24, 2026

(54) SYSTEM FOR TRACTION INSIDE PIPES, WITH FLEXIBLE RESERVOIR AND WITH MOTORIZED PUMP FOR HYDRAULIC POWER

(71) Applicants:PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

(72) Inventors: Hugo Francisco Lisboa Santos, Rio de Janeiro (BR); Rafael Antônio Comparsi Laranja, Porto Alegre (BR); Henrique Theissen Mendel, Porto Alegre (BR); Eduardo André Perondi, Porto Alegre (BR); Tiago Becker, Porto Alegre (BR); Ney Robinson Salvi Dos Reis, Rio de Janeiro (BR)

(73) Assignees: PETRÓLEO BRASILEIRO S.A.—PETROBRAS, Rio de Janeiro (BR); UNIVERSIDADE FEDERAL DO RIO GRANDE DO SUL—UFRGS, Porto Alegre (BR)

( * ) Notice: Subject to any disclaimer, the term of this patent is extended or adjusted under 35 U.S.C. 154(b) by 384 days.

(21) Appl. No.: 18/260,137

(22) PCT Filed: Dec. 17, 2021

(86) PCT No.: PCT/BR2021/050558
§ 371 (c)(1),
(2) Date: Jun. 30, 2023

(87) PCT Pub. No.: WO2022/140828
PCT Pub. Date: Jul. 7, 2022

(65) Prior Publication Data
US 2024/0052962 A1 Feb. 15, 2024

(30) Foreign Application Priority Data
Dec. 30, 2020 (BR) ..................... 10 2020 027057 5

(51) Int. Cl.
| | |
|---|---|
| *F16L 55/32* | (2006.01) |
| *B08B 9/049* | (2006.01) |
| *F15B 13/02* | (2006.01) |
| *F15B 15/14* | (2006.01) |
| *F15B 15/18* | (2006.01) |
| *E21B 37/00* | (2006.01) |

(52) U.S. Cl.
CPC .............. *F16L 55/32* (2013.01); *B08B 9/049* (2013.01); *F15B 13/027* (2013.01);
(Continued)

(58) Field of Classification Search
CPC ...... F16L 55/32; B08B 9/049; B08B 2209/04; F15B 13/027; F15B 15/1428; F15B 15/18; E21B 37/00
See application file for complete search history.

(56) References Cited

U.S. PATENT DOCUMENTS

| | | | |
|---|---|---|---|
| 3,495,546 A | 2/1970 | Ernest |
| 4,481,816 A | 11/1984 | Prentice |
| | (Continued) | | |

FOREIGN PATENT DOCUMENTS

| | | |
|---|---|---|
| BR | PI0405971 | 8/2006 |
| BR | PI0603022 | 3/2008 |
| | (Continued) | |

OTHER PUBLICATIONS

International search report and written opinion dated Jul. 7, 2022 in application No. PCT/BR2021/050558.

*Primary Examiner* — Stephen D Meier
*Assistant Examiner* — Quang X Nguyen
(74) *Attorney, Agent, or Firm* — Knobbe, Martens, Olson & Bear, LLP

(57) ABSTRACT

The present invention provides a pulling system essentially consisting of two sets of feet (11) and a hydraulic cylinder (15). Each set is positioned on one of the sides of the hydraulic cylinder (15). The two sets of feet (11) have a self-locking mechanism. The self-locking mechanism allows each set of feet to act preferentially on one side and
(Continued)

exert powerful forces. The invention further provides a flexible reservoir (21) capable of equalizing the pressures inside and outside the medium, allowing the operation of a hydraulic system in an environment that is subjected to any pressure value, provided that it is within the operating range of the components. In addition, the maintenance of a closed circuit ensures that no fluid contamination occurs.

21 Claims, 6 Drawing Sheets

(52) U.S. Cl.
    CPC .......... *F15B 15/1428* (2013.01); *F15B 15/18* (2013.01); *B08B 2209/04* (2013.01); *E21B 37/00* (2013.01)

(56) References Cited

U.S. PATENT DOCUMENTS

| | | | |
|---|---|---|---|
| 5,029,614 | A | 7/1991 | Lara |
| 5,375,530 | A | 12/1994 | Zollinger |
| 5,881,420 | A | 3/1999 | Bruckelmyer |
| 6,339,993 | B1 | 1/2002 | Cornelio |
| 6,415,722 | B1 | 7/2002 | Reis |
| 6,672,222 | B2 | 1/2004 | Salvi Dos Reis |
| 7,328,475 | B2 | 2/2008 | Smith |
| 8,281,444 | B2 | 10/2012 | Rosen |
| 8,925,590 | B2 | 1/2015 | Khalifa |
| 11,098,838 | B2 | 8/2021 | Grote |
| 2003/0150351 | A1 | 8/2003 | Salvi Dos Reis |
| 2006/0248949 | A1* | 11/2006 | Gregory ............... E21B 49/088 73/152.51 |
| 2014/0020593 | A1* | 1/2014 | Early ..................... F16L 55/32 105/26.05 |
| 2015/0337630 | A1 | 11/2015 | Cioanta et al. |
| 2020/0080381 | A1* | 3/2020 | Hardin, Jr. ............... E21B 7/06 |
| 2023/0400140 | A1 | 12/2023 | Rodrigues et al. |

FOREIGN PATENT DOCUMENTS

| | | |
|---|---|---|
| BR | PI0002915 | 5/2009 |
| BR | 102018072062 | 5/2020 |
| CA | 2480534 | 3/2006 |
| CA | 2530932 | 6/2007 |
| CN | 109158390 | 1/2019 |
| GB | 2301414 | 12/1996 |
| GB | 2351304 | 10/2003 |
| KR | 20160023960 | 3/2016 |
| WO | WO 20/082149 | 4/2020 |

* cited by examiner

SYSTEM FOR TRACTION INSIDE PIPES, WITH FLEXIBLE RESERVOIR AND WITH MOTORIZED PUMP FOR HYDRAULIC POWER

FIELD OF THE INVENTION

The present invention is part of the field of IMR-Inspection, Maintenance and Repair activities in the pipeline network, such as: locating, cleaning and removing incrustations and obstructions, inspection and monitoring of the internal surface, cutting of lines, installation of equipment, smoothing and dimensional recompositing of pipelines, among other needs of oil production lines or any activities that use pipelines as a transport modal.

The invention proposes the use of a tool connected to a locomotion device, such as an umbilical cable connected to a robot. This tool will remove obstructions, among other operations inside the pipelines. One of the achievements of the present invention is the development of a robot traction device, which allows this equipment to move over long distances by its own means, without the need for flow inside the pipelines, as is the case with current systems based on pigs. The traction system essentially consists of two sets of pawls and a hydraulic cylinder. In order to enable the actuation of the cylinder, in this invention, a reservoir provided with a body of elastomeric material was designed. The proposed reservoir allows the operation of the hydraulic system in an environment of any pressure within the operating range of the components, since the pressures, both internal and external, remain equalized. In addition, the fact of remaining in a closed circuit ensures that no contamination of any fluid occurs.

DESCRIPTION OF THE STATE OF THE ART

Oil production from marine wells almost always involves drilling wells and its interconnection with Stationary Production Units, SPUs. This interconnection is made through rigid pipelines or flexible pipelines. Additionally, such units can be interconnected to other units or to ground stations, also through rigid or flexible pipelines.

The pipelines may eventually be subject to restrictions or blockages, which can be caused, for example, by hydrates or paraffins. In some situations, it is possible to unblock the line using devices known as Flextubes (Coiled Tubing), which are flexible steel tubes wound in the form of a coil, which are pushed into the line similar to the use of a catheter for medical/clinical use, and serve to take to the place of interest various types of fluids and chemical products to be used in unblocking. However, due to the high friction coefficient values found between the equipment and the pipeline walls, such equipment cannot move efficiently over long distances inside the pipeline, in pipelines with complex geometry, or in an upward direction. In addition, many platforms do not have the capacity to operate them due to their weight.

Currently, the commonly adopted solution is to try to unblock these lines from the SPU. For this, different techniques are used, such as depressurization and injection of solvents. Such techniques can be used from the SPU, from a probe, or from another installation connected to the line. In the case of hydrate obstructions, a flextube can be inserted from the SPU. It is possible in cases where the riser has a free catenary configuration and when the hydrate obstruction is close to the vertical stretch. It is not applicable in risers with configuration lazy wave, lazy-S or equivalent. Also, it is not applicable in situations where the hydrate was formed far from the vertical stretch, which corresponds to most cases.

In cases where it is applicable, the flextube can be lowered from the SPU, performing a depressurization of the line, in order to promote the breakdown of the hydrate. In addition to configuration and distance limitations, depressurization is a technique that presents considerable risks. Such risks are associated with the large pressure differential existing between the ends of the hydrate. The pressure differential causes the hydrate to move at great speed towards the SPU, potentially causing damage upon arrival.

In cases where the flextube cannot be lowered from the SPU, a different solution is used. A probe accesses the well and, from this access, a flextube is lowered. This flextube then performs the depressurization of the line and the consequent breakdown of the hydrate. However, such a solution usually takes months and is extremely expensive.

In paraffin obstructions, the common approach is to use the technique based on equipment called PIG (Pipeline Intervention Gadget) of cleaning before the paraffin completely obstructs a region of the pipeline. Eventually, the PIG is arrested during this operation. In cases where the PIG entrapment occurs or even a severe/total obstruction by paraffin or any other reason, there is still no developed solution that has been commercially available. It is because such equipment necessarily requires a pressure differential inside the pipeline so that they can be moved, and this condition occurs if there is any flow inside the pipeline. In these cases, the well-known and traditional "pig" technique comes up against insurmountable limits. In these situations, experimental solutions can be tested, or the entire flexible line is replaced, or the lifting and repair of a rigid line, when dealing with a rigid line. These are two operations of extremely high cost.

Thus, in general, the available techniques are time-consuming and costly. In addition, from pipeline blockage to complete removal of the obstruction, there is lost profit associated with the interruption of well production.

When a similar situation occurred in one of Petrobras' facilities, the search for a solution and answers to this situation began the studies that are best described in U.S. Pat. No. 6,415,722 and PI 9904364. From then on, research and development continued, which, due to their originality, led to the materialization of prototypes that were serial heads, which served to demonstrate innovative concepts, and which formed the basis for the current patent, as will be described below. The first developments were registered in patents PI9904364-5, PI0603022-0, PI0405971-9 A.

The present invention proposes the use of a tool, connected to a locomotion device; for example, a robot, with an umbilical cable, like the concepts and proposals described in the U.S. Pat. No. 6,415,722 and PI 9904364-5, plus their improvements and enhancements, later described in U.S. Pat. No. 6,672,222 and PI 00029157. For large distances, as in typical applications in pre-salt fields, the contact of the outer part of the umbilical cable with the inner surface of the pipelines causes a frictional force with a significant amplitude that makes it difficult for the robot to move. The purpose of the set is to take the tool close to the obstruction. Such a tool will perform the removal of the obstructions or other operations.

One of the objectives of the present invention is the robot traction device. This system, along with a system developed to minimize frictional forces, as disclosed in BR 10 2018 072062-7, PCT/BR2019/050461, allows the robot to move over long distances.

The peristaltic movement system works as follows: 1) with the cylinder extended, the forelegs set anchors to the wall 2) the cylinder is contracted, bringing with it the hindlegs set and the rest of the robot, 3) the hindlegs set anchors to the wall, and 4) the cylinder is extended again. The cycles are repeated with each movement of the set. When completing item 4, return to 1.

The traction system essentially comprises two leg sets and a hydraulic cylinder. The self-locking mechanism allows the robot to exert forces of high magnitude due to the angle of the legs. This angle, normally quite open, causes the forces exerted when pulling the robot and the umbilical to strongly press the legs against the wall. Thus, the generated friction force has great magnitude and allows the robot to exert high forces. These forces are responsible for moving the entire assembly along the pipelines, dragging the umbilical with it.

Each leg set is positioned on one side of the hydraulic cylinder. Both sets have a self-locking mechanism. The self-locking mechanism allows each leg set to preferentially act to one side and exert forces of great magnitude. To allow energy transfer over long distances, an umbilical is used for electrical energy transfer from the launch site (platform) to the robot itself. This energy is converted into hydraulic power through motor pump sets.

The traction device is used to provide the displacement of tools, robotic or not, inside pipes. Such tools can be used to remove obstructions, such as hydrates or paraffins. They can also be used for carrying out inspection operations, cutting lines, equipment installation, smoothing out pipelines, etc. Additionally, the curve of the legs, designed specifically for this purpose, allows the robot to maintain the angle of the legs approximately constant, even with small variations in the diameter of the pipeline.

Environments with low or high pressure often have fluids or gases that prevent the use of an open hydraulic reservoir, since direct contact with the external environment (local atmosphere) causes contamination of the working fluid. A solution for such an application is the use of a closed reservoir, so that there is no direct contact between the working fluid and the external environment. Such a solution brings some challenges, such as the equalization of the internal and external pressures of the reservoir (mainly in applications where large variations in external pressures may occur, such as in systems that must submerge at great depths), allied to the compensation that must be made with the variation of the volume of working fluid present inside the reservoir. This variation exists due to the actuators drive that, depending on their position, require a greater or lesser amount of fluid for their operation.

Traditional solutions involve the use of a hydraulic actuator with a through rod, which is unviable for the applications of the present invention, due to the restrictions on the available volume, or the use of commercial accumulators, which also has an impediment associated with the space limitations.

The reservoir object of this invention was designed with a body of elastomeric material (synthetic rubber), which has the necessary elasticity to deform as the fluid volume inside the reservoir varies. Also, due to its flexibility, the reservoir disclosed herein allows the equalization between the internal and external pressures.

The reservoir of this invention can be used in low and high pressure environments, since there is equalization of the internal pressure with the external one, and in situations where there must be no direct contact between the fluids of the internal work environment with the external environment. By compensating the pressure difference, the developed system can be used in situations where the ambient pressure is high, relative to the working differential pressure.

Document GB2301414A discloses a vehicle that can perform operations inside a pipeline. Such a vehicle has a train of modules interconnected by suspension units. The first module of the train is the traction module, which includes an engine inside one of the arms and ends in wheels, which enable the movement of the vehicle. The work also discloses an equipment capable of pulling tools, the contact thereof with the inner wall of the tube being made with wheels. Particularly, the wheels of the system presented in GB2301414A do not allow performing high magnitude forces in pipes with small diameters and high bending radii. By having a self-locking peristaltic system, the invention is able to accomplish this feat.

Document US20150337630A1 discloses a pipe cleaning apparatus, which has a shock wave generator module and a traction module. The equipment has turbine modules that use the fluid flow in the pipe to produce energy for the traction module. The traction module has motors that act on wheels designed to adapt to variations in pipe dimensions. It differs from the present invention by making contact with the surface of the inner wall of the pipeline through wheels and not through legs. Compared to the present invention, the wheels of the system presented in US20150337630A1 do not allow performing high magnitude forces in pipes with small diameters and high bending radii. As it is provided with a self-locking peristaltic system, the invention is able to accomplish this feat.

Additionally, US20150337630A1 does not reveal an electro-hydraulic assembly to drive the traction system, a reservoir with a flexible coating to compensate the variations in the ambient pressure, hydraulic pistons with regenerative hydraulic circuits, and a fail-safe system, with system depressurization and closing of the legs by spring, like the present invention.

Document KR20160023960A discloses a pipe cleaning device comprising a plurality of modules, joint-structural connection units to connect the modules; and a suction part arranged in the module part to suck internal foreign materials from the pipe. In this device, the traction module has caterpillars that make contact between the device and the inner wall of the pipeline and are designed to adjust to variations in the diameter of the pipe. However, the tracks of the system shown in KR20160023960A do not allow performing high magnitude forces in pipes with small diameters and high bending radii. It is possible in the system of the present invention, as it is provided with a self-locking peristaltic system.

Additionally, the system described in KR20160023960A does not have an electro-hydraulic assembly to drive the traction system, a reservoir with a flexible coating to compensate the variations in the ambient pressure, hydraulic pistons with regenerative hydraulic circuits, and a fail-safe system, with system depressurization and closing of the legs by spring, like the present invention.

Object of the Invention

The object of the present invention is a system provided with a traction device inside pipelines and a hydraulic system capable of operating in environments of any pressure within the operating range of the components.

SUMMARY

In order to achieve the above-described objects, the system of the present invention is provided with a traction device, which essentially consists of two leg sets and a hydraulic cylinder. Each set is positioned on one side of the hydraulic cylinder. Both sets have a self-locking mechanism. The self-locking mechanism allows each leg set to preferentially act to one side and exert forces of great magnitude.

The system also has a reservoir capable of equalizing the internal and external pressures of the medium, and can also be applied in situations where there should be no direct contact between the fluid in the internal work environment and the external environment, allowing the operation of a hydraulic system in an environment that is subjected to any pressure value, since it is within the operating range of the components.

BRIEF DESCRIPTION OF THE DRAWINGS

The present invention will be described in more detail below, with reference to the attached figures which, in a schematic and not limiting of the inventive scope, represent examples of its realization. The drawings show:

FIG. 8a illustrates the forward cylinder and FIG. 8b the backward cylinder;

DETAILED DESCRIPTION OF THE INVENTION

Below follows a detailed description of a preferred embodiment of the present invention, by way of example and in no way limiting. Nevertheless, it will be clear to a person skilled in the art, from the reading of this description, possible additional embodiments of the present invention further comprised by the essential and optional features below.

The present invention proposes the use of a tool connected to a locomotion device, such as an umbilical cable connected to a robot, for carrying out operations inside pipelines, such as removing obstructions, such as hydrates or paraffins, inspection, cutting lines, equipment installation, smoothing, etc.

For large distances, the contact of the outer part of the umbilical cable with the inner surface of the pipelines causes a frictional force with a significant amplitude, which makes it difficult for the robot to move.

One of the objectives of this invention is a traction system for this robot. This device system, along with a system developed to minimize frictional forces, allows the robot to move over long distances. The traction device essentially consists of two leg sets and a hydraulic cylinder. Each set is positioned on one side of the hydraulic cylinder. Both sets have a self-locking mechanism.

The self-locking mechanism allows each leg set to preferentially act to one side and exert forces of great magnitude. Initially, one of the leg sets is moved forward by the hydraulic cylinder. This leg set attaches to the pipe and the cylinder is retracted. This brings the other leg set forward, as well as the rest of the robot and the umbilical. The leg set is designed in such a way that self-locking occurs in a similar way for a range of pipeline diameters. For this, it uses a specific curvature that allows the robot to maintain approximately the same self-locking angle.

Figure 1:
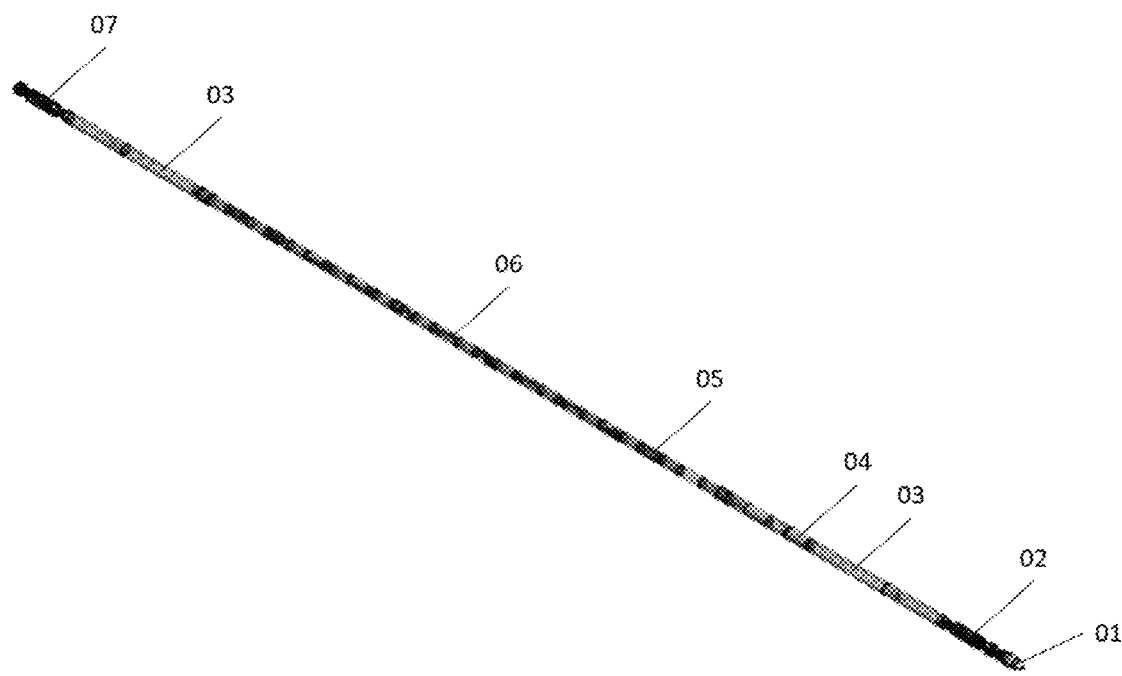
FIG. 1 illustrates an overview of the traction system of this invention.

FIG. 1 presents an overview of the traction system of this invention. This device consists of a coupling with the tool itself (01), responsible for carrying out operations inside the pipelines. It also has a front traction module (02), responsible for moving the robot forward, dragging the umbilical cable. It is also provided with a winding module (03) to compensate the displacement of the hydraulic cylinder. It may contain an auxiliary tool (04) for carrying out other activities. To drive the hydraulic cylinder, there are one or more motor pump sets (05), responsible for receiving electrical energy and transforming it into hydraulic power. Additionally, one or more manifolds (06) direct the hydraulic fluid to one side of the main cylinder, or to the auxiliary cylinder. Also, in (07) the rear traction module is represented.

Figure 2:
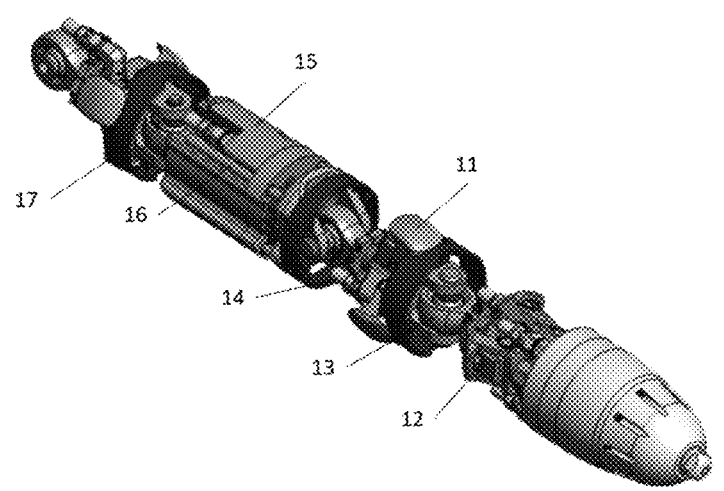
FIG. 2 illustrates the front traction module.
Figure 3:
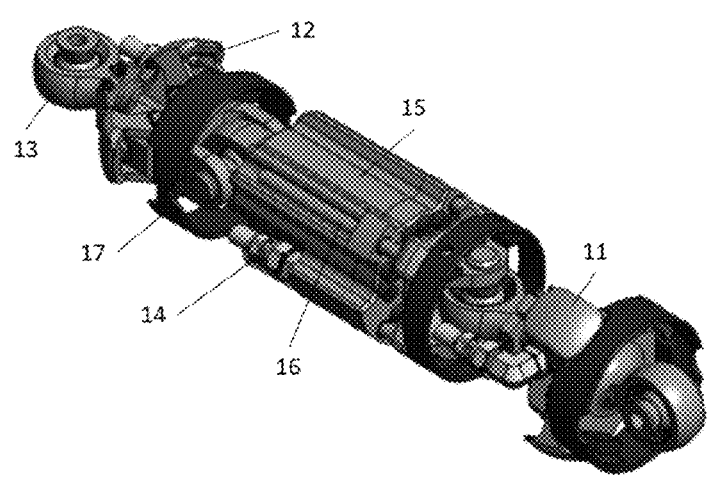
FIG. 3 illustrates the rear traction module.

FIG. 2 represents the front traction module, and FIG. 3, the rear traction module.

The robot legs (11) make contact with the inside of the pipe and perform the traction. These legs are designed to allow self-locking. In addition, they were also designed to maintain a constant angle relative to the internal surface of the pipe, within a range of pipeline diameters. For this purpose, it has its own geometry on its contact surface, as shown in FIGS. 4a and 4b.

Figure 4A:
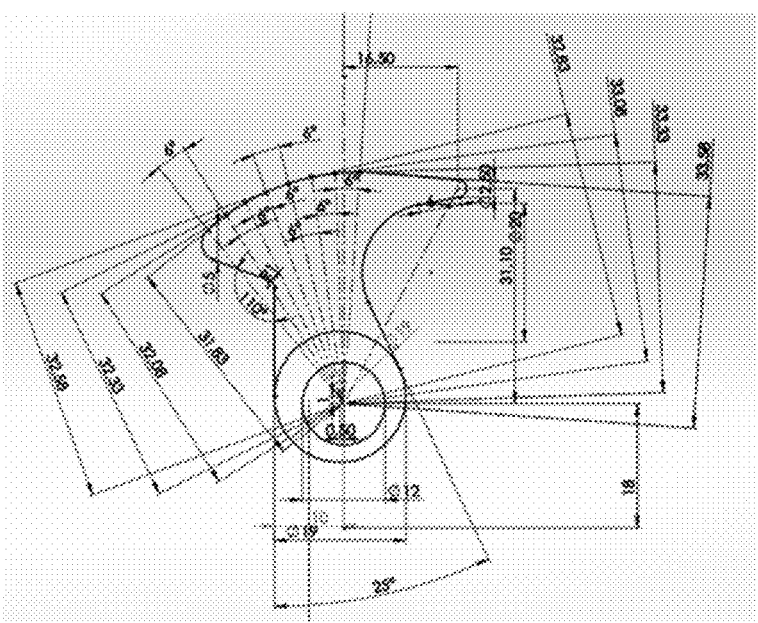
FIG. 4a illustrates the leg curve, constructed by joining several points through a spline.
Figure 4B:
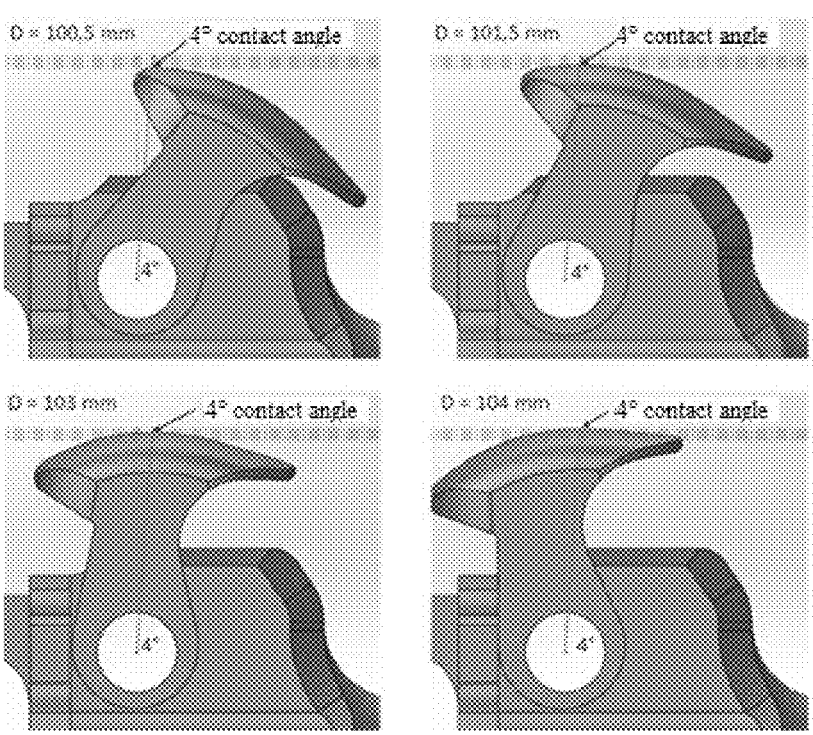
FIG. 4b shows an example of a design procedure for a 4° leg in a 4 inch tube, where (a) represents the 4° contact angle with respect to the inner surface of the pipe.

According to FIG. 4a, the leg curve was constructed by joining several points through a spline, in order to illustrate the method, as a non-limiting example, the design procedure for a 4° leg on a 4-inch pipe is represented. The points are obtained through straight lines, as shown in FIG. 4a. For each pipeline diameter (from 100.5 to 104 mm), the distance from the center of the fluke axis to the contact point is calculated at a constant angle of 4°, which is fixed at 18.50 mm. The value of 18.50 mm represents the distance from the center of the robot to the center of the leg axis. Then, with these values, lines are constructed with an angle between them of 6° (determined through iterations and adjustments). The line ends (dots) are connected through a spline, as shown in FIG. 4a. Further, on every 6° that the leg rotates in relation to its axis, it advances 0.5 mm radially. Thus, as can be seen in FIG. 4b, the angle is kept constant at 4° for the range used (100.5 to 104 mm). Other dimensions and geometries are designed to meet other design requirements.

Alternatively, the curve can be obtained numerically, for example, through the numerical integration of the equation $$\frac{dy}{dx} = \frac{1 + \frac{y}{x} \cdot \tan\beta}{\frac{y}{x} - \tan\beta},$$

where x and y are the values on the cartesian axes and $\beta$ is the desired contact angle.

7

It is important to highlight that in order to design the leg several other aspects had to be analyzed. As it is a piece that works in association with others, it cannot be considered just its curvature. Correct operation depends on several factors. The example given herein was for the 4° leg, but it is important to note that for each angle (4°, 7.5°, 10° . . . ), there is a need for a different detailed analysis.

As shown in FIGS. 2 and 3, some small cylinders (12) perform the opening of the legs. Flexible couplings (13) connect the leg sets to each other, to the tool, to the cylinder, or to other parts of the robot. Connectors (14) allow hydraulic fluid to flow from the manifolds for the cylinders. The main hydraulic cylinder (15) is responsible for the front or rear displacement. Some guides (16) keep the cylinder in its course. Finally, cable protectors (17) preserve the hydraulic hoses.

Figure 5:
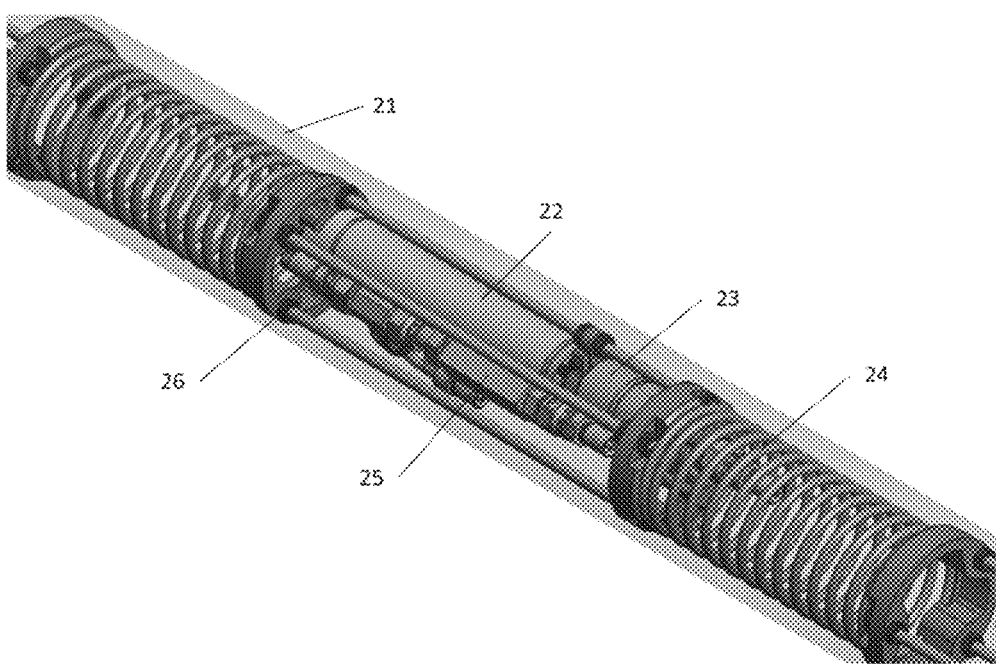
FIG. 5 illustrates in detail a motor pump module.
Figure 6:
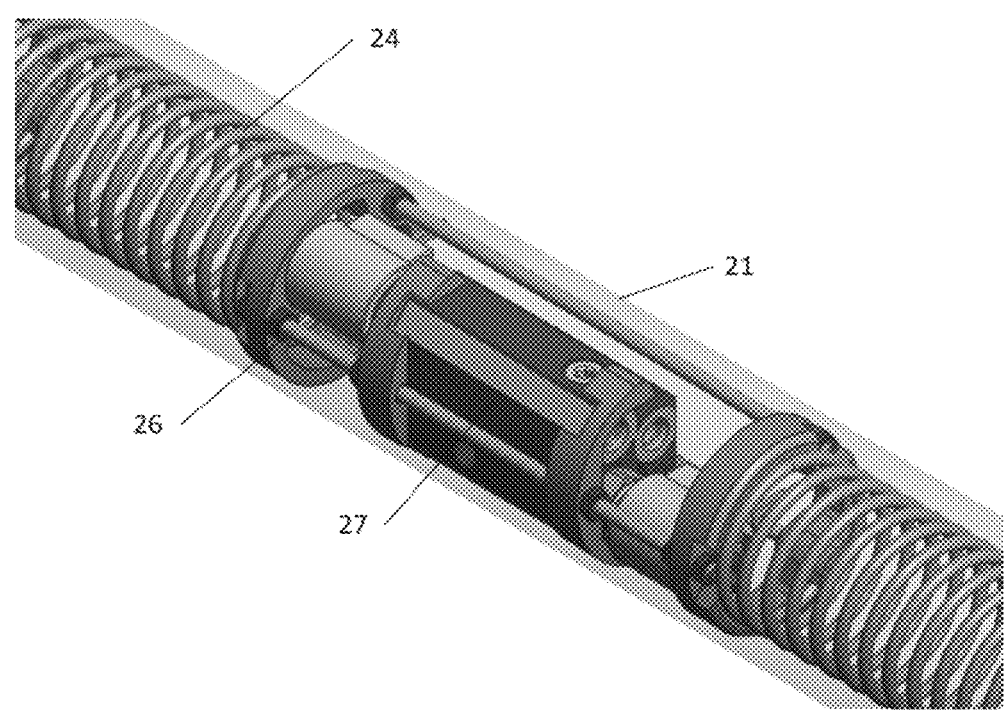
FIG. 6 illustrates in detail the manifolds module.

FIG. 5 shows a motor pump module in detail and FIG. 6 shows the manifolds module in detail. The flexible body reservoir (21) is responsible for keeping the hydraulic oil separated from the medium and for balancing the reservoir pressure with the medium pressure. The electric motor (22) is responsible for moving the hydraulic pump (23). Additionally, a tensioner (24), possibly in the form of a helical spring, is responsible for keeping the reservoir (21) tensioned. A check valve (25) allows the valves to operate independently, and the structure (26) is responsible for supporting the set. Finally, the manifold with the valves (27) is responsible for directing the hydraulic fluid to one side of the main piston of the cylinder, or to the auxiliary pistons.

To allow the energy transfer over long distances, an energy electrical transfer is used, from the launch site (platform) to the robot itself. This energy is converted into hydraulic power through motor pump sets (05). The hydraulic fluid then passes through manifolds (06) and actuates the so-called displacement cylinders and the cylinders for opening the legs. The hydraulic circuit used to actuate the cylinder can be a regenerative circuit, which allows a higher forward speed for the cylinder.

There is the possibility for manifolds to be responsible for controlling the system, or for the engine and pump system be installed either inside or outside a reservoir, without impairing its function, provided that the system remains sealed, with the hydraulic fluid returning into the reservoir.

Figure 7:
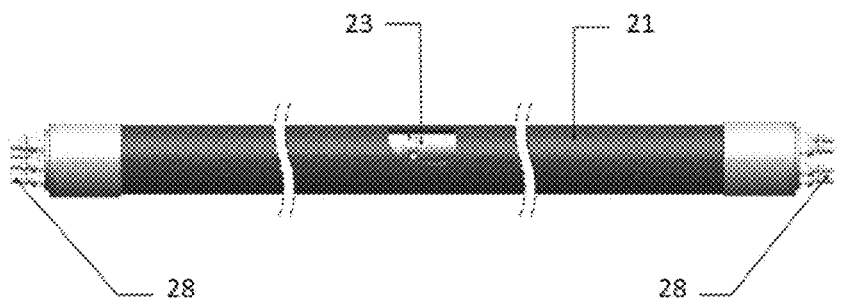
FIG. 7 illustrates the reservoir with flexible body, developed in this invention.

To enable the cylinder to operate, the reservoir was designed with a body of elastomeric material (synthetic rubber), as shown in FIG. 7, which has the necessary elasticity to deform as the fluid volume inside the reservoir varies. Also, due to its flexibility, the reservoir allows the equalization between the internal and external pressures. At its ends, hydraulic connections for input and output have been provided, so that it is possible to connect it to actuators through hoses. In FIG. 7 are represented: the reservoir with flexible body (21), the hydraulic pump (23), and the ends with connections for inlet and outlet of the working fluid (28).

Figure 8A:
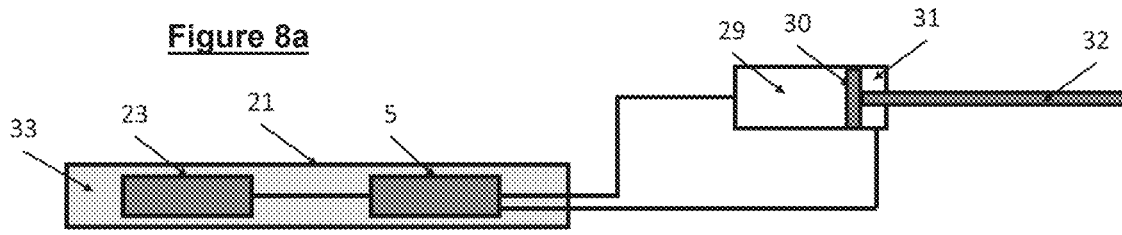
FIGS. 8a and 8b illustrate the flexible body reservoir concept developed in this invention.
Figure 8B:
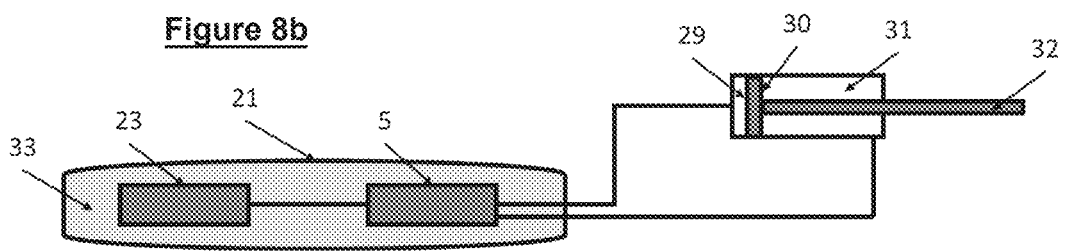

The concept of a reservoir with a flexible body is represented in FIGS. 8a and 8b. Due to the fact that the reservoir has a flexible body, there is an equalization of the internal pressure Pi with the external pressure Pe, so that Pi=Pe. This causes the pressure that reaches the cylinder chamber to be Pe added to the pressure JP that the pump needs to make available for the piston to carry out the movement. FIG. 8a illustrates the forward cylinder and FIG. 8b the backward cylinder. It is represented: motor pump (05), closed/flexible reservoir (21), hydraulic pump (23), advance chamber (29), cylinder (30), recoil chamber (31), cylinder rod (32), variable reservoir volume (33).

As a consequence of the asymmetric cylinder chambers (with non-passing rod) having different volumes and the entire working fluid remaining in a tight system, the volume of the reservoir must vary so that overpressure does not occur in it. This happens because the recoil chamber has a rod passing through it, which does not occur in the advance chamber. Thus, when the piston recoils, part of the fluid that was previously in the advance chamber (which has a greater useful volume) passes into the volume of the cylinder advance chamber, while the other part (referring to the volume occupied by the rod) passes to the inside of the reservoir, so that there is a greater amount of fluid in its inside. In general, the cylinder piston recoil operation becomes possible due to the flexibility effect of the reservoir body proposed in the invention. The volume variation present in the reservoir is also represented in FIGS. 8a and 8b.

The reservoir presented in this invention can be used in low and high pressure environments, since there is equalization of the internal pressure with the external one, and in situations where there should be no direct contact between the fluid in the internal work environment and the external environment. By compensating the pressure difference, the developed system can be used in situations where the ambient pressure is high, relative to the working differential pressure. In this case, the motor pump system sums its nominal differential pressure in relation to the pressure of the external local atmosphere, ensuring the proper operation of the actuator in terms of speed and force available.

Figure 9:
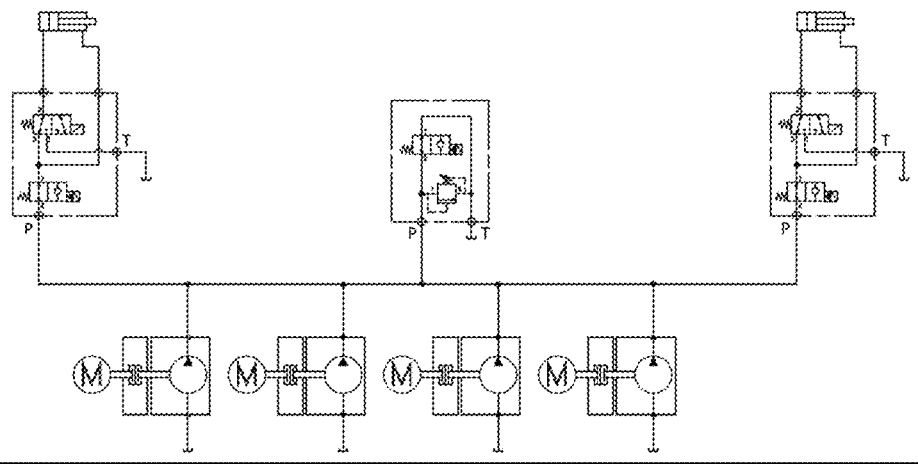
FIG. 9 shows a preferred configuration for the hydraulic circuit to control the forward main cylinder and the backward main cylinder.

FIG. 9 presents a preferential configuration for the hydraulic control circuit of the forward and backward cylinders. This hydraulic circuit uses a regenerative circuit in order to increase the displacement efficiency. Additionally, it has an automatic depressurization system in case of failure and a set of two or more motor pumps for redundancy.

Figure 10:
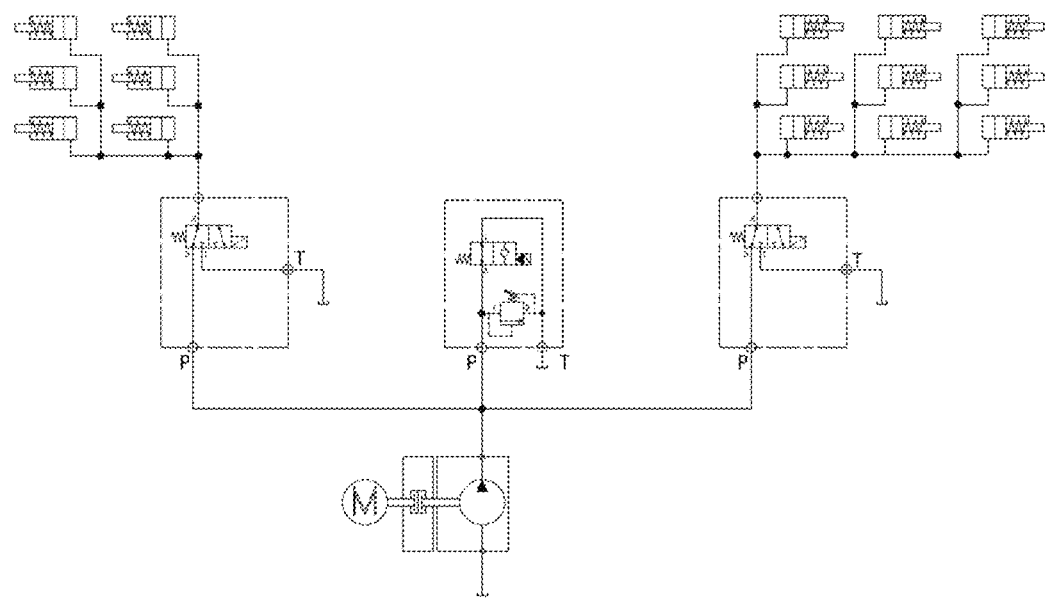
FIG. 10 presents a preferred configuration for the hydraulic control circuit of the auxiliary cylinders of the forward and backward system.

FIG. 10 shows a preferred configuration for the hydraulic control circuit of the auxiliary cylinders, both for the forward and backward system. The auxiliary cylinders have spring return, and the hydraulic system is automatically depressurized in the event of a power failure or failure. Thus, in the event of a power outage or failure, the legs are automatically retracted.

The invention claimed is:

1. A system for traction inside pipelines comprising:
at least one front traction module comprising:
    a main hydraulic cylinder;
    one or more main leg sets coupled to the main hydraulic cylinder, wherein the one or more main leg sets are configured to contact an internal surface of a pipe;
    one or more guides coupled to the main hydraulic cylinder, wherein the one or more guides are configured to steer the main hydraulic cylinder within the pipe; and
    one or more auxiliary cylinders coupled to the one or more leg sets via a flexible coupling;
at least one motor pump assembly comprising one or more hydraulic pumps, the at least one motor pump assembly coupled to the at least one front traction module;
at least one manifold in fluid communication with the at least one motor pump assembly; and
a rear traction module in fluid communication with the at least one manifold, the rear traction module comprising:
    a rear main hydraulic cylinder:
    one or more rear leg sets coupled to the rear main hydraulic cylinder, the one or more rear leg sets configured to contact the internal surface of the pipe;

one or more rear guides coupled to the rear main hydraulic cylinder, wherein the one or more rear guides are configured to steer the rear main hydraulic cylinder within the pipe; and a rear auxiliary cylinder coupled to the rear main hydraulic cylinder.

2. The system of claim 1, wherein the one or more leg sets are self-locking.

3. The system of claim 1, wherein the one or more leg sets are operable to maintain a constant angle relative to the internal surface of the pipe.

4. The system of claim 1, wherein the one or more auxiliary cylinders are configured to operate the one or more main leg sets.

5. The system of claim 1, wherein the at least one motor pump assembly further comprises a check valve for allowing the one or more hydraulic pumps to operate independently, the check valve positioned adjacent the one or more hydraulic pumps.

6. The system of claim 5, wherein the at least one motor pump assembly further comprises a first set of support structures coupled to the check valve.

7. The system of claim 6, wherein the at least one manifold further comprises a control valve set for directing a hydraulic fluid to a side of the main hydraulic cylinder or to the one or more auxiliary cylinders.

8. The system of claim 7, wherein the at least one manifold further comprises a second set of support structures coupled to the control valve set.

9. The system of claim 1, wherein the at least one motor pump assembly and the at least one manifold are housed within a flexible reservoir.

10. The system of claim 9, wherein the flexible reservoir is made of elastomeric material.

11. The system of claim 9, wherein the flexible reservoir comprises a plurality of connections on a front end and a back end for receiving and releasing a hydraulic fluid.

12. The system of claim 9, wherein the flexible reservoir further comprises a plurality of tensioners connected to the flexible reservoir, the plurality of tensioners configured to apply a force to the flexible reservoir.

13. The system of claim 12, wherein the plurality of tensioners comprise one or more of a helical spring, a plate spring, or a bundle of springs.

14. The system of claim 12, wherein the plurality of tensioners are coupled to a first set of support structures and a second set of support structures.

15. The system of claim 9, wherein the flexible reservoir is configured to separate a hydraulic fluid from a medium in the pipe.

16. The system of claim 1, further comprising one or more winding modules coupled to the at least one manifold, wherein the one or more winding modules are configured to compensate for a movement of one or more hydraulic hoses.

17. The system of claim 1, further comprising one or more connectors in fluid communication with one or more hydraulic hoses which promote displacement of a hydraulic fluid of the at least one manifold to the main hydraulic cylinder and the one or more auxiliary cylinders.

18. The system of claim 1, wherein the at least one motor pump assembly further comprises:

one or more hydraulic pumps in fluid communication with the one or more hydraulic hoses; and one or more electric motors configured to drive the one or more hydraulic pumps.

19. The system of claim 1, further comprising a plurality of cable protectors disposed over the one or more hydraulic hoses in the front and rear traction modules.

20. A system for traction inside pipelines comprising:

at least one front traction module comprising:

a main hydraulic cylinder;

one or more leg sets coupled to the main hydraulic cylinder, wherein the one or more leg sets are configured to contact an internal surface of a pipe;

one or more guides coupled to the main hydraulic cylinder, wherein the one or more guides are configured to steer the main hydraulic cylinder within the pipe; and one or more auxiliary cylinders coupled to the one or more leg sets via a flexible coupling;

at least one motor pump assembly coupled to the at least one front traction module; and at least one manifold in fluid communication with the at least one motor pump assembly;

wherein the at least one motor pump assembly and the at least one manifold are housed within a flexible reservoir; and wherein the flexible reservoir further comprises a plurality of tensioners connected to the flexible reservoir, the plurality of tensioners configured to apply a force to the flexible reservoir.

21. A system for traction inside pipelines comprising:

at least one front traction module comprising:

a main hydraulic cylinder;

one or more leg sets coupled to the main hydraulic cylinder, wherein the one or more leg sets are configured to contact an internal surface of a pipe;

one or more guides coupled to the main hydraulic cylinder, wherein the one or more guides are configured to steer the main hydraulic cylinder within the pipe; and one or more auxiliary cylinders coupled to the one or more leg sets via a flexible coupling;

at least one motor pump assembly coupled to the at least one front traction module; and at least one manifold in fluid communication with the at least one motor pump assembly; and one or more winding modules coupled to the at least one manifold, wherein the one or more winding modules are configured to compensate for a movement of a plurality of hydraulic hoses.

* * * * *